(12) United States Patent
Watanabe et al.

(10) Patent No.: US 6,945,848 B1
(45) Date of Patent: Sep. 20, 2005

(54) LENS SHAPE DATA PROCESSING APPARATUS AND LENS GRINDING MACHINE HAVING THE SAME APPARATUS

(75) Inventors: Takahiro Watanabe, Tokyo (JP); Yoshiyuki Hatano, Tokyo (JP); Yasuhito Eto, Tokyo (JP); Takumi Uchiyama, Tokyo (JP); Toshihiro Iwai, Tokyo (JP); Kenichi Watanabe, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 108 days.

(21) Appl. No.: 09/689,807

(22) Filed: Oct. 13, 2000

(30) Foreign Application Priority Data

Oct. 15, 1999 (JP) ................................. 11-293929
May 16, 2000 (JP) ............................. 2000-143784

(51) Int. Cl.[7] ............................................ B24B 49/00
(52) U.S. Cl. ................................ 451/8; 451/5; 451/42
(58) Field of Search ............................. 451/8, 5, 42, 43, 451/44

(56) References Cited

U.S. PATENT DOCUMENTS

| | | | | |
|---|---|---|---|---|
| 4,945,684 A | * | 8/1990 | Wada et al. ................. 33/529 |
| 5,716,256 A | * | 2/1998 | Mizuno et al. ............. 424/401 |
| 5,775,973 A | * | 7/1998 | Watanabe ...................... 451/5 |
| 5,908,348 A | * | 6/1999 | Gottschald | |
| 5,926,247 A | * | 7/1999 | Kimura ........................ 351/41 |
| 5,934,972 A | * | 8/1999 | Gottschald .................... 451/5 |
| 5,959,199 A | * | 9/1999 | Suzuki et al. ................ 73/104 |
| 6,045,432 A | * | 4/2000 | Shibata .......................... 451/5 |
| 6,163,967 A | * | 12/2000 | Suzuki et al. ................ 33/200 |
| 6,290,569 B1 | * | 9/2001 | Mizuno et al. ................ 451/5 |
| 6,336,057 B1 | * | 1/2002 | Obayashi ................... 700/164 |

FOREIGN PATENT DOCUMENTS

| | | |
|---|---|---|
| EP | 0 884 047 | 5/1998 |
| EP | 0 881 036 | 12/1998 |
| EP | 0 894 567 | 2/1999 |

* cited by examiner

*Primary Examiner*—Joseph J. Hail, III
*Assistant Examiner*—Alvin J Grant
(74) *Attorney, Agent, or Firm*—Oblon, Spivak, McClelland, Maier & Neustadt, P.C.

(57) ABSTRACT

A lens shape data processing apparatus and a lens grinding machine having the same apparatus in which the lens shape data reading out and the layout setting work for another spectacle lens can be conducted during the lens edge measurement or the grinding process is provided. The lens shape processing apparatus comprises a memory 33 for storing a plurality of lens shape information for the spectacle frame measured by a frame reader 2, a liquid crystal display unit 7 including an image display section 7b for displaying the lens shape based on the lens shape information and an operation contents display section 7c for displaying items for switching a plurality of screens, a plurality of keys corresponding to the items of the operation contents display section 7c, and an arithmetic control circuit 31 for setting the data for grinding an unprocessed lens into a lens shape based on the lens shape information, wherein the keys are used both to switch to a screen for selecting and accessing one of the lens shape information stored in the memory 33, and to access the preceding lens shape information and the next lens shape information or new lens shape information.

24 Claims, 14 Drawing Sheets

Example of memory area allocation

F I G. 14
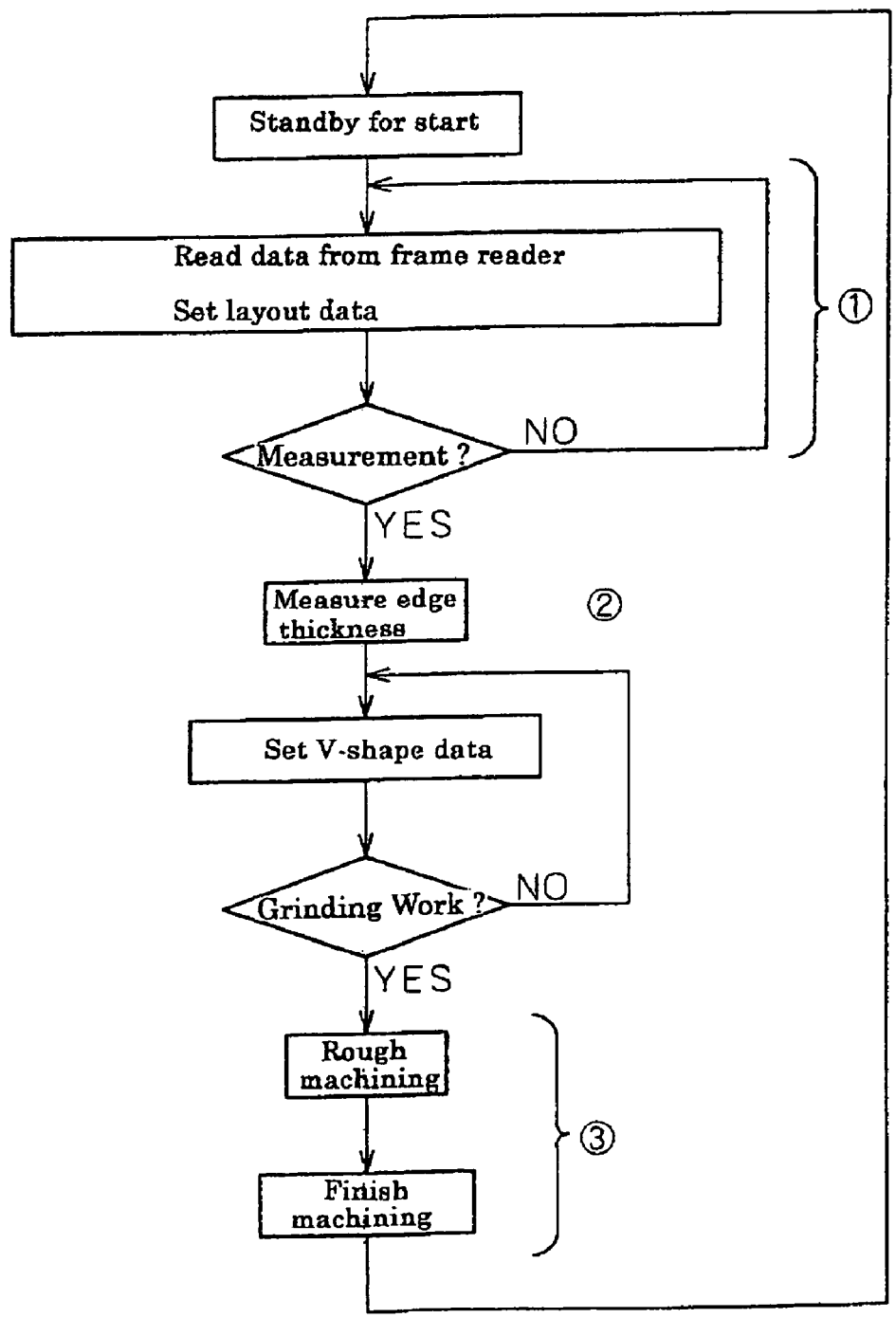

LENS SHAPE DATA PROCESSING APPARATUS AND LENS GRINDING MACHINE HAVING THE SAME APPARATUS

TECHNICAL FIELD PERTINENT TO THE INVENTION

The present invention relates to a lens shape data processing apparatus for determining the machining conditions for grinding the spectacle lens based on the lens shape data for the spectacle frame, and a lens grinding machine having the same apparatus.

PRIOR ART

The working processes for the conventional lens grinding machine are carried out in the steps described below with reference to FIG. 14.

First, a spectacle frame is mounted on a frame shape measuring unit in the standby state before starting the next grinding process upon completion of the previous lens grinding process. Then, the lens shape corresponding to the spectacle frame (spectacle lens frame or a corresponding template) is measured, and by reading the lens shape data, a layout including a papillary distance (PD), a shift of the lens center (UP) and a machining size for fitting spectacle lens in the spectacle frame are set and input (① of FIG. 14).

Upon complete input of the layout setting, an instruction is given to start the measurement (a start switch is turned on) thereby to start the measurement process.

At the same time, thickness of edge of the spectacle lens is measured (② of FIG. 14), after which a screen to check V-shaped lens edge setting is displayed. While watching this screen, positions of top and foot of the V-shaped edge portion or curve of the V-shaped portion are corrected or adjusted to machine the V-shaped edge portion into a desired shape.

After correcting or adjusting the V-shaped edge portion data, the grinding work is started (③ of FIG. 14).

Upon completion of a rough machining, a finish machining is started and after the machine returns to standby state for machining another lens.

Problems to be Solved by the Invention

As described above, in conducting the work by the conventional lens grinding machine, the lens layout setting process can be performed only while the machine is in standby state (① of FIG. 14), and until the layout input is finished, the lens grinding machine remains in standby state and cannot start the grinding work. Also, during the lens edge thickness measurement (② of FIG. 14) requiring considerable time of the lens measurement process and the grinding process (③ of FIG. 14), the layout setting and input process for grinding another spectacle lens cannot be carried out, and it is necessary to wait for the completion of the ongoing grinding process before conducting the layout setting process for another spectacle lens to be next ground.

As a result, the efficiency of the lens grinding work is so low that the number of spectacle lenses that can be machined in a day is limited. The present invention has been developed to solve the aforementioned problems, and the object thereof is to provide a lens shape data processing apparatus and a lens grinding machine having the same apparatus capable of processing data on the layout setting for grinding another spectacle lens during the lens edge thickness measurement or the grinding work in order to improve the efficiency of the lens grinding work.

SUMMARY OF THE INVENTION

In order to achieve this object, according to the first aspect of the invention, a lens shape data processing apparatus for setting and adjusting the lens shape data of the spectacle frame characterized by comprising storage means for storing a plurality of lens shape data measured by a lens shape data measuring unit is provided.

According to the second aspect of the invention, a lens shape data processing apparatus for setting and adjusting the lens shape data of the spectacle frame characterized by comprising storage means for storing a plurality of lens shape data measured by a lens shape data measuring unit and arithmetic processing means for reading a plurality of the lens shape data stored in the storage means and adjusting the lens shape data is provided.

According to the third aspect of the invention, a lens shape data processing apparatus comprising display means including an image display unit for displaying a plurality of lens shape information for spectacle frames and an operation contents display unit for displaying items for switching a plurality of screens, a plurality of keys corresponding to said items of said operation contents display unit, and arithmetic control means for setting the data for grinding an unprocessed lens into a lens shape based on said lens shape information characterized by said plurality of keys include first function key for switching the screen to select and access one of said plurality of lens shape information and second function key for accessing the preceding lens shape information and the next lens shape information or new lens shape information is provided.

According to the fourth aspect of the invention, a lens shape data processing apparatus comprising display means including an image display unit for displaying a plurality of lens shape information for spectacle frames and an operation contents display unit for displaying items for switching a plurality of screens, a plurality of keys corresponding to said items of said operation contents display unit, and arithmetic control means for setting the data for grinding an unprocessed lens into a lens shape based on said lens shape information characterized by said plurality of keys include first function key for switching the screen to select and access one of said plurality of lens shape information and second function key for accessing the preceding lens shape information and the next lens shape information or new lens shape information and further comprising memory for storing said plurality of the lens shape information for the spectacle frames is provided.

According to the fifth aspect of the invention, a lens grinding machine comprising input means for inputting a plurality of lens shape data for spectacle frames, lens edge shape measuring means for measuring the lens edge shape of an unprocessed spectacle lens based on the input lens shape data for the spectacle frames and machining means for grinding the edge surface of said unprocessed spectacle lens based on the lens shape according to the result of measurement by the edge surface shape measuring means, characterized by further comprising arithmetic processing means for selecting one of said plurality of lens shape data, and setting and adjusting the machining conditions for the unprocessed spectacle lens based on said selected lens shape data during the operation of said edge surface measuring means or during the operation of the machining means is provided.

According to the sixth aspect of the invention, a lens grinding machine comprising input means for inputting a plurality of lens shape data for spectacle frames, lens edge shape measuring means for measuring the lens edge shape of an unprocessed spectacle lens based on the input lens shape data for the spectacle frames and machining means for grinding the edge surface of said unprocessed spectacle lens based on the lens shape according to the result of measurement by the edge surface shape measuring means, characterized by further comprising arithmetic processing means setting and adjusting the machining conditions for the unprocessed spectacle lens based on following lens shape data of used for the ongoing operation during the operation of said edge surface measuring means or during the operation of the machining means is provided.

According to the seventh aspect of the invention, a lens grinding machine characterized by comprising memory means for storing the machining conditions for the unprocessed spectacle lens based on the machining conditions for the unprocessed spectacle lens based on selected lens shape data or machining conditions for the unprocessed spectacle lens based on following lens shape data of set and adjusted during the operation of said edge surface shape measuring means or during said operation of the machining means is provided.

According to the eighth aspect of the invention, a lens grinding machine which comprises lens shape data processing apparatus comprising display means including an image display unit for displaying a plurality of lens shape information for spectacle frames and an operation contents display unit for displaying items for switching a plurality of screens, a plurality of keys corresponding to said items of said operation contents display unit, and arithmetic control means for setting the data for grinding an unprocessed lens into a lens shape based on said lens shape information characterized by said plurality of keys include first function key for switching the screen to select and access one of said plurality of lens shape information and second function key for accessing the preceding lens shape information and the next lens shape information or new lens shape information and further comprising memory for storing said plurality of the lens shape information for the spectacle frames is provided.

DETAILED DESCRIPTION OF THE INVENTION

This invention will be explained in detail below with reference to embodiments and the accompanying drawings.

BRIEF DESCRIPTION OF THE DRAWINGS

FIG. 14 is a flowchart showing an example of the machining process flow in the conventional lens grinding machine.

Embodiment 1

Configuration

Figure 1:
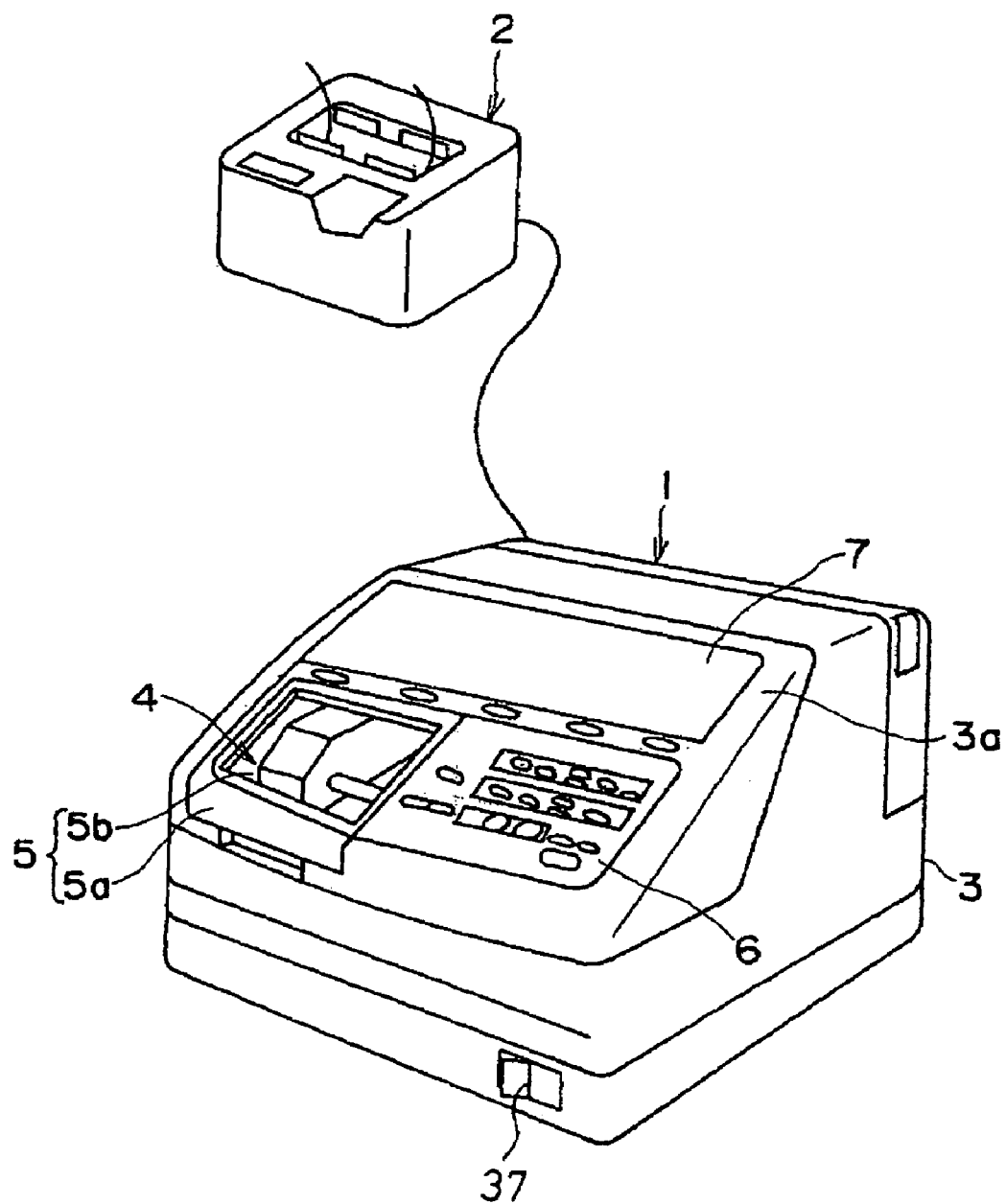
FIG. 1 is a diagram for explaining the relation between a lens grinding machine having a lens shape data processing unit and a frame reader according to the first embodiment of the present invention.

In FIG. 1, reference numeral 1 designates a lens grinding machine constituting a lens lapping machine, and numeral 2 a frame reader constituting a frame shape measuring unit (lens shape data measuring unit). The frame reader 2 is adapted to read the lens shape information (θi, ρi) indicated by the angle θi and the radius vector ρi from the shape of the spectacle lens frame, a template thereof or a lens shape model. The frame reader 2 may be a well known one and it will not be described in detail.

Lens Grinding Machine 1

The lens grinding machine 1 includes a machine body 3 having an operation means mounting surface 3a adapted to incline toward the operator, a machining chamber 4 arranged in the machine body 3 and open to the lower left side of the operation means mounting surface 3a and a cover 5 for closing the machining chamber 4 adapted to open/close. This cover 5 includes a transparent member 5b mounted on a frame 5a.

The lens grinding machine 1 also includes grinding means arranged in the machining chamber 4 and lens edge thickness measuring means adapted to extend into or retract from the machining chamber 4.

Grinding Means

This grinding means includes a carriage swingable vertically about the rear end thereof and movable laterally, a vertical moving means for vertically rotating the carriage using a drive motor such as a pulse motor, the drive motor such as a pulse motor for laterally moving the carriage, a pair of lens rotation shafts (lens holding shafts) held in series coaxially in lateral direction at the forward end of the carriage, a drive motor such as a pulse motor for rotating the lens rotation shafts, and grinding stones for grinding an unprocessed lens held between the lens rotation shafts with the vertical rotation of the carriage. The grinding stones include s a rough grinding stone, a V-shaping grinding stone and a finish grinding stone and so on. The grinding means holds the unprocessed lens (lens yet to be machine) between the lens rotation shafts, controls the rotation of the lens rotation shafts and the vertical rotation of the carriage based on the lens shape information (θi, ρi), and roughly grinds the peripheral edge of the unprocessed lens into a lens shape (lens frame shape) with a rotating rough grinding stone. Also, the grinding means controls the rotation of the lens rotation shafts and the vertical rotation of the carriage based on the lens shape information (θi, ρi) constituting the lens frame shape information, while at the same time controlling the drive motor for driving the carriage laterally based on the set position of the V-shaped portion so that the edge of the unprocessed lens roughly machined into a lens shape is cut into V shape. This unprocessed lens grinding means (grinding machine) may have a well-known structure and therefore will not be explained in detail.

Lens Edge Thickness Measuring Means

It is also possible to use a well-known lens edge thickness measuring means (lens edge shape measuring means) extendible into and retractable from the machining chamber 4. For example, while holding the unprocessed lens between the lens rotation shafts described above, the interval between a pair of feelers extendible into and retractable from the machining chamber 4 by a drive motor such as a pulse motor is detected as a lens edge thickness by edge thickness detection means. In this configuration, lens edge thickness measuring means can be used in which the forward ends of the pair of feeler advanced into the machining chamber 4 are brought into contact with the front and rear refraction surfaces of the unprocessed lens, and at the same time, the rotation of the drive motor for driving the lens rotation shafts is controlled for each angle of θi based on the lens shape information (θi, ρi) on the one hand and the operation of the drive motor for driving the feelers is controlled to move the position at which the feelers are in contact with the unprocessed lens to the position of the radius vector ρi of the unprocessed lens on the other hand, thus determining the distance between the feelers by the interval measuring means as the edge thickness W for the lens shape information (θi, ρi). Such a lens edge thickness measuring means may have a well known configuration and it will not be described in detail.

Operation Panel and Liquid Crystal Display Unit

Further, the lens grinding machine 1 includes an operation panel (setting operation means) 6 used for setting data or controlling the operation of each drive motor for the grinding means or the edge thickness measuring means, and a liquid crystal display unit (display means) 7 for displaying the operating conditions, etc. of the operation panel 6.

Figure 2:
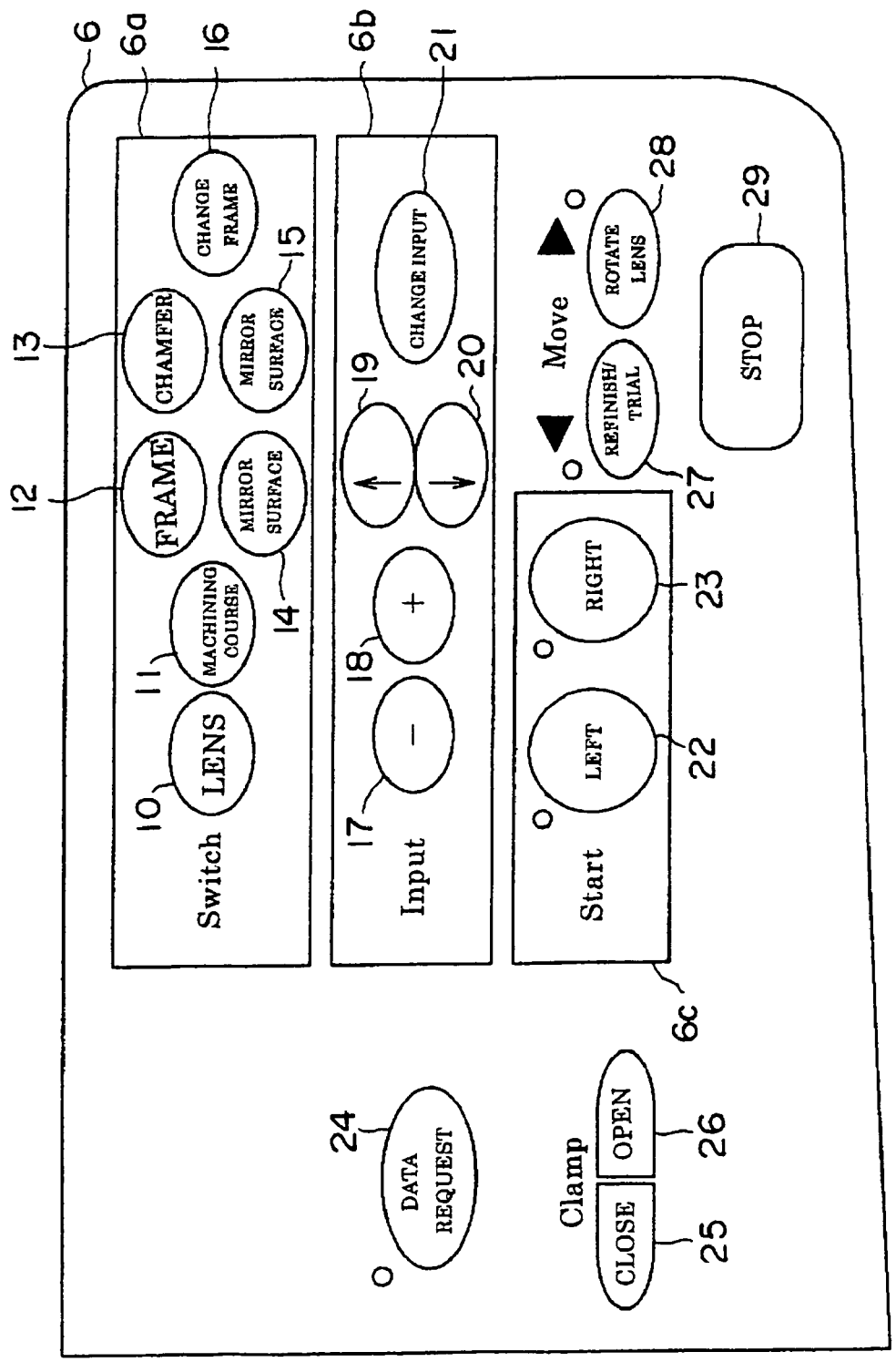
FIG. 2 is an enlarged view for explaining the operation panel shown in FIG. 1.

The operation panel 6, as shown in FIG. 2, includes a panel section 6a for switching the mode, a panel section 6b for changing the input and a panel section 6c for starting the operation.

The panel section 6a includes a LENS mode switch 10 for selecting the lens material, a MACHINING COURSE mode switch 11 for selecting the machining course such as the edge thickness measurement mode, the V-cut setting mode or the lens grind mode, a FRAME mode switch 12 for selecting the frame material, a CHAMFER mode switch 13, a MIRROR SURFACE mode switches 14 and 15 for mirror surface machining, and a FRAME CHANGE mode switch 16 for changing to a new frame while continuing to use the old lens.

The panel section 6b includes a "−" switch 17, a "+" switch 18 for changing the numerical value displayed on the liquid crystal display unit 7, a "↑"switch 19, "*" switch 20 used for selecting an item of a select menu displayed on the liquid crystal display unit 7, and an INPUT CHANGE mode switch 21 for changing the input such as the geometric center distance (frame FPD) between the left and right lens frames, the papillary distance PD and the up shift (UP) while the machining operation is performed in the mode selected by the switches 10 to 16 on the panel section 6a.

The panel section 6c includes a LEFT start switch 22 for grinding the left lens and a RIGHT start switch 23 for grinding the right lens.

The operation panel 6 includes a DATA REQUEST switch 24 for requesting data of the lens shape information (θi, ρi) indicated by the angle θi and the radius vector ρi to the frame reader 2, a CLOSE mode switch 25 for clamping the unprocessed lens between the lens rotation shafts by driving the lens rotation shafts along the axis thereof in such a manner that the opposite ends of the rotation shafts approach each other, an OPEN mode switch 26 for permitting the unprocessed lens to be demounted from between the lens rotation shafts by driving the lens rotation shafts along the axis thereof in such a manner that the opposite ends of the lens rotation shafts move away from each other, a REFINISH/TRIAL mode switch 27, a LENS ROTATION mode switch 28 and a STOP mode switch 29.

Control Circuit

Figure 3:
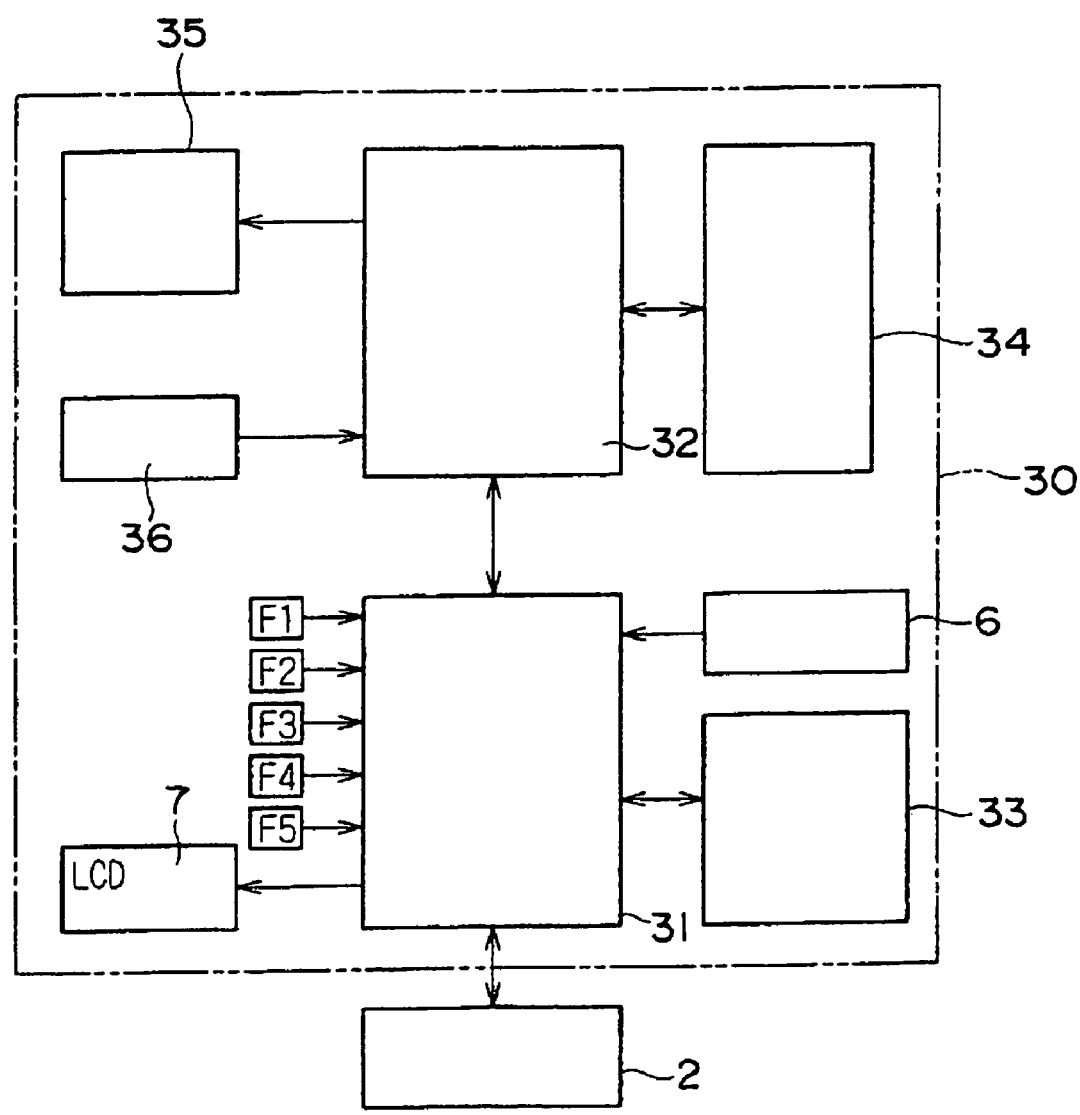
FIG. 3 is a diagram for explaining a control circuit for the lens grinding machine shown in FIG. 1.

The lens grinding machine 1 includes a control circuit 30 shown in FIG. 3. This control circuit 30 includes a first arithmetic control circuit (arithmetic control means) 31 having a first CPU-1 (first arithmetic means), and a second arithmetic control circuit (arithmetic control means) 32 having a second CPU-2 (second arithmetic means) and connected to the first arithmetic control circuit 31.

The first arithmetic control circuit 31 is used for reading data from a memory or setting the layout for machining the lens during the measurement of lens edge thickness or during the lens grinding process. The second arithmetic control circuit 32, on the other hand, is used for controlling the lens grinding process such as the rough machining, the V-shape machining and the finish machining based on the layout information (machining conditions) after measuring the edge thickness.

The first arithmetic control circuit 31 is connected with a frame shape measuring unit 2, switches 10 to 29 of the operation panel 6, a set data memory (first storage means) 33 for storing the data set during the machining operation and a liquid crystal display unit 7. The second arithmetic control circuit 32, on the other hand, is connected with a machining data memory (second storage means) 34 for storing the data of the ongoing machining operation, a control circuit 35 for controlling the driving operation of each drive motor of the grinding means and interval measuring means 36 of the edge thickness measuring means. In FIG. 1, numeral 37 designates a power switch.

Function Key

The operation means mounting surface 3a has arranged thereon a plurality of function keys F1 to F5 at intervals from left to right along the lower edge of the liquid crystal display unit 7. The operation signals for the function keys F1 to F5 are input to the first arithmetic control circuit 31. The function keys F1 to F5 are set to correspond to the information displayed on the lower edge portion of the liquid crystal display unit 7. By selectively depressing the function keys F1 to F5 corresponding to the contents of display, the arithmetic control circuit 31 changes the display mode by changing the display contents on the liquid crystal display unit 7 partially or wholly in accordance with the contents of display corresponding to the function key selected.

Operation

Now, the control operation of the control circuit 30 of the lens grinding machining having the configuration described above will be explained with reference to FIGS. 4 and 5.

As soon as the power switch 37 of the lens grinding machine 1 is turned on, the control operation is started by the first arithmetic control circuit 31 and the second arithmetic control circuit 32.

(1) Control Operation of the First Arithmetic Control Circuit 31

Step S1

Figure 4:
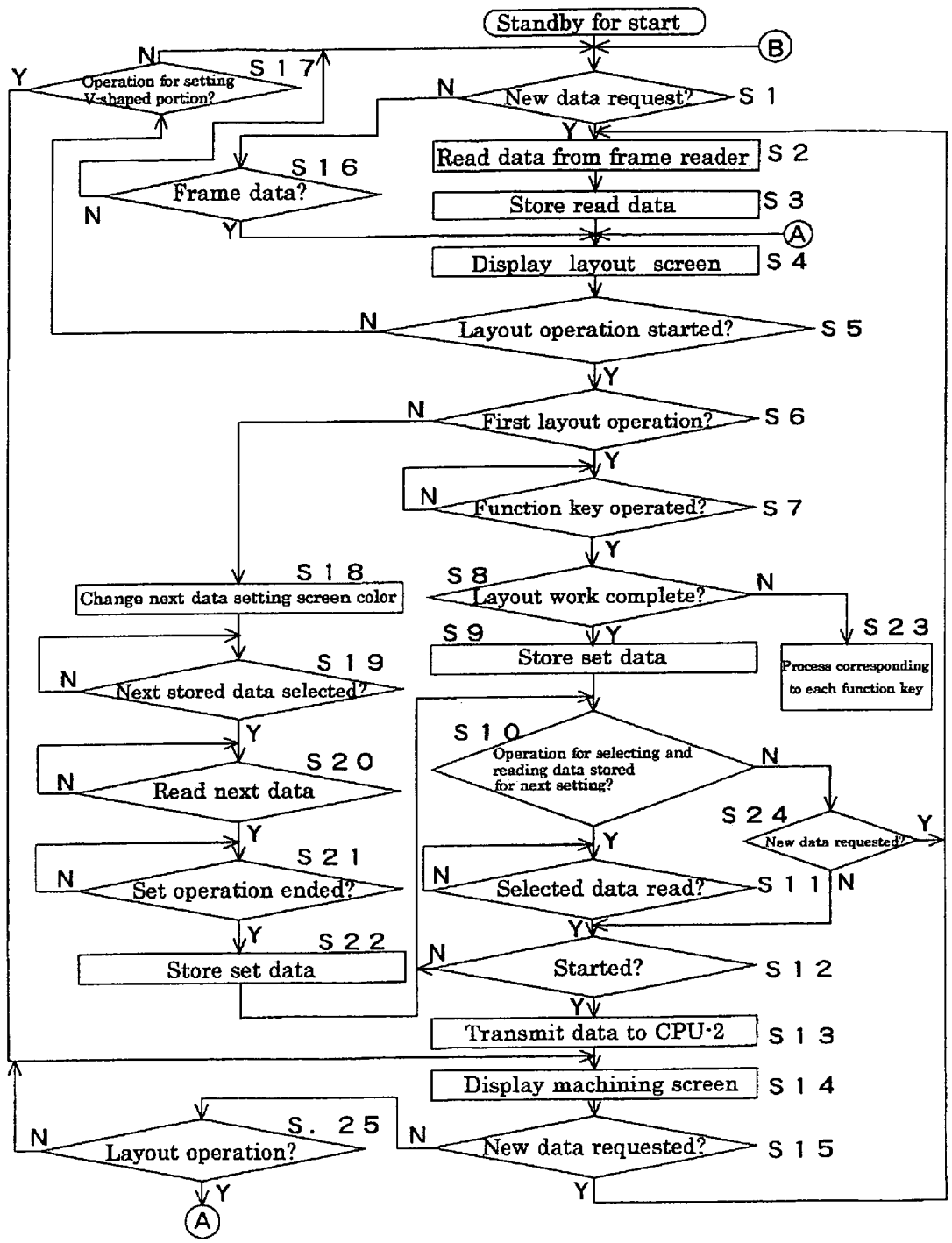
FIG. 4 is a control flowchart for the first arithmetic control circuit shown in FIG. 3.

The first arithmetic control circuit 31 determines whether a data request switch 24 has been turned on or not in step S1 of FIG. 4. In the case where data is requested, the process proceeds to step S2. Otherwise, the process proceeds to step S16.

Step S2

In this step, the data of the lens shape information (θi, ρi) indicated by the angle θi and the radius vector ρi is read from the frame reader 2 and the process proceeds to step S3.

Step S3

In this step, the data of the lens shape information (θi, ρi) thus read is stored in the set data memory 33 and the process proceeds to step S4.

Step S4

Figure 6:
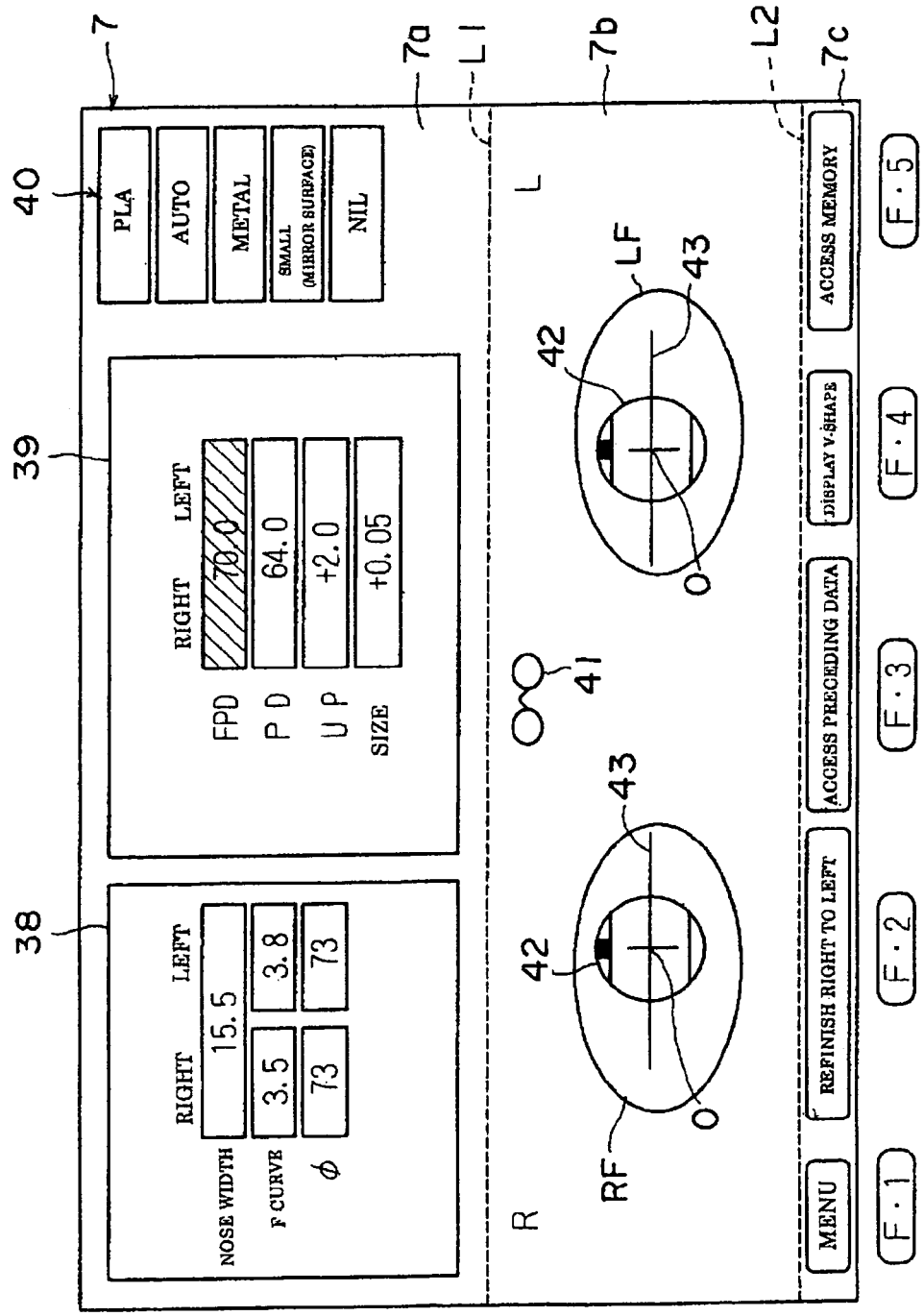
FIG. 6 is a diagram for explaining the layout setting screen displayed on a liquid crystal display unit shown in FIG. 1.

In this step, the screen for setting the layout shown in FIG. 6 is displayed on the liquid crystal display unit 7 and the process proceeds to step S5.

The screen of the liquid crystal display unit 7 includes a data display section 7a, an image display section 7b and a function key operation display section 7c for the function keys F1 to F, defined by two dashed lines L1, L2 extending laterally.

The substantially upper half portion of the liquid crystal display unit 7 is used for the data display section 7a, the substantially lower half portion of the liquid crystal display unit 7 is used for the image display section 7b, and the lower edge portion of the liquid crystal display unit 7, is used for the function key operation contents display section 7c.

Further, in this step, the arithmetic control circuit 31 displays a display frame 38 having input frames for NOSE WIDTH, the frame curve (F CURVE) and "φ" and a display frame 39 having data input frames for a geometric frame center distance FPD, the papillary distance PD, the up shift amount UP and SIZE, together with information for discrimination, LEFT and RIGHT, in the data display section 7a of the liquid crystal display unit 7. In addition, the arithmetic control circuit 31 displays a selection menu 40 having such selection frames as PLA, AUTO, METAL, SMALL (MIRROR SURFACE) and NIL on the extreme right side of the data display section 7a of the liquid crystal display unit 7.

Also, the arithmetic control circuit 31 displays a spectacle shape 41 for displaying the shape of the lens shape for the spectacle frame in the upper central portion of the image display section 7b of the liquid crystal display unit 7. At the same time, the arithmetic control circuit 31 displays a lens adsorption jig shape 42 and a left lens shape (left frame shape) LF overlapped on each other in the right portion of the image display section 7b of the liquid crystal display unit 7 on the one hand, and a lens adsorption jig shape 42 and a right lens shape (right frame shape) RF overlapped on each other in the left portion of the image display section 7b of the liquid crystal display unit 7 on the other hand. A cross hairs 43 indicating the center 0 of each lens adsorption jig shape is also displayed at the same time. The center 0 constitutes an optical center of each of the lens shapes LF, RF.

Further, such items as MENU, REFINISH RIGHT TO LEFT, ACCESS PRECEDING DATA, DISPLAY V-SHAPED EDGE PORTION and ACCESS MEMORY are displayed at positions corresponding to the function keys F1 to F5, respectively, by the arithmetic control circuit 31.

When MENU is displayed on the liquid crystal display unit 7 by depressing the function key F1, such item as REGISTER or RECORD included in the menu is selected. Then, the set data is stored in the memory 33.

Step S5

In this step, the IN PUT CHANGE mode switch 21 on the operation panel 6 is operated to determine whether the layout operation has been started or not. In the case where the layout operation is started, the process proceeds to step S6. Otherwise, the process proceeds to step S17.

Step S6

In this step, it is determined whether the layout operation is the first one or not. In the case where the layout operation after power on is the first one, the process proceeds to step S7, and in the case where the layout operation after power on is the second or subsequent one, the process proceeds to step S18.

Step S7

In this step, it is determined whether any of the function keys F1 to F5 has been depressed or not. In the case where any of them is depressed, the process proceeds to step S8. Otherwise, the process is looped.

During the looping, the layout process is carried out by inputting the geometric center distance between left and right lens frames (FRAME FPD), the papillary distance PD and the up shift UP by operating the switches 17 to 21 arranged on the panel section 6b of another operation panel 6. As a result, the lens frames LF and RF displayed on the liquid crystal display unit 7 of FIG. 6 are moved in either of four directions relative to the cross hairs 43 thereby to accomplish the layout.

Step S8

In this step, the function key F1 is depressed, the MENU display operation is performed, and it is determined whether the item REGISTER or RECORD of the menu is selected. In the case where REGISTER or RECORD is selected, the layout operation is terminated, and the process proceeds to step S9. Otherwise, the process proceeds to step S23.

Step S9

In this step, the layout result is stored in the set data memory 33 and the process proceeds to step S10.

Step S10

Figure 7:
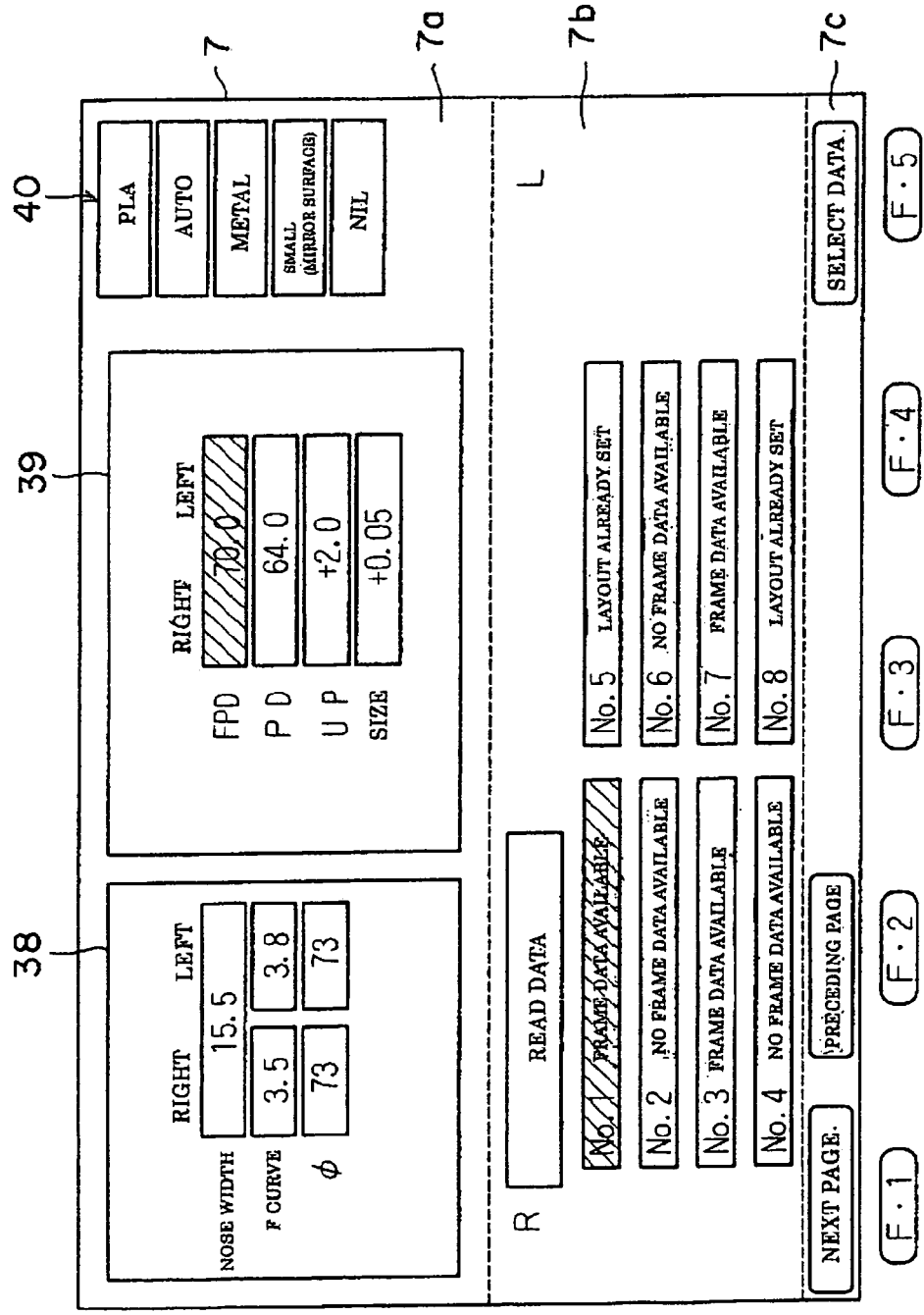
FIG. 7 is a diagram for explaining a data selection screen displayed on the liquid crystal display unit shown in FIG. 1.

In this step, the function key F5 is depressed to determine whether the operation for reading the data for data selection stored in the set data memory 33 has been performed or not. In the case where the data read operation has been performed, the select screen for the set data stored in the set data memory 33 is displayed as shown in FIG. 7. Otherwise, the process proceeds to step S24.

On the set data selection screen of FIG. 7, the selection frames designated by Nos. 1 to 8 are displayed, and the presence or absence in the selection frames designated by Nos. 1 to 8 a plurality of the frame data stored in the set data memory 33 as well as the presence or absence of the data for which the layout has been set is displayed.

Step S11

In this step, the function key F5 is depressed to perform SELECT DATA thereby to determine whether the data read operation is complete or not. Unless the data read operation is complete, the looping is effected. During the looping, one of the selection frames Nos. 1 to 8 displayed on the set data selection screen of FIG. 7 is selected using the switches 19, 20 on the operation panel 6 thereby to change the display color of the selected display frame. In addition, this operation causes one of the data Nos. 1 to 8 with a changed display frame is read from the set data memory 33 and displayed in the display frames 38, 39 in the upper portion of the liquid crystal display unit 7.

Also, the function key F5 is depressed to perform SELECT DATA, and the data read operation is complete, the process proceeds to step S12.

Step S12

In this step, it is determined whether the start switch 22 or 23 has been depressed or not. In the case where the start switch 22 or 23 has been depressed, the process proceeds to step S13. Otherwise, the process returns to step S10 for looping.

Step S13

In this step, the layout data stored in step S9 or selected in step S11 is sent to the second arithmetic control circuit 32 and the process proceeds to step S14. The second arithmetic control circuit 32, upon receipt of the layout data from the first arithmetic control circuit 31, starts the normal machining operation. The machining operation by the arithmetic control circuit 32 is performed separately from the control operation by the arithmetic control circuit 31.

Step S14

Figure 8:
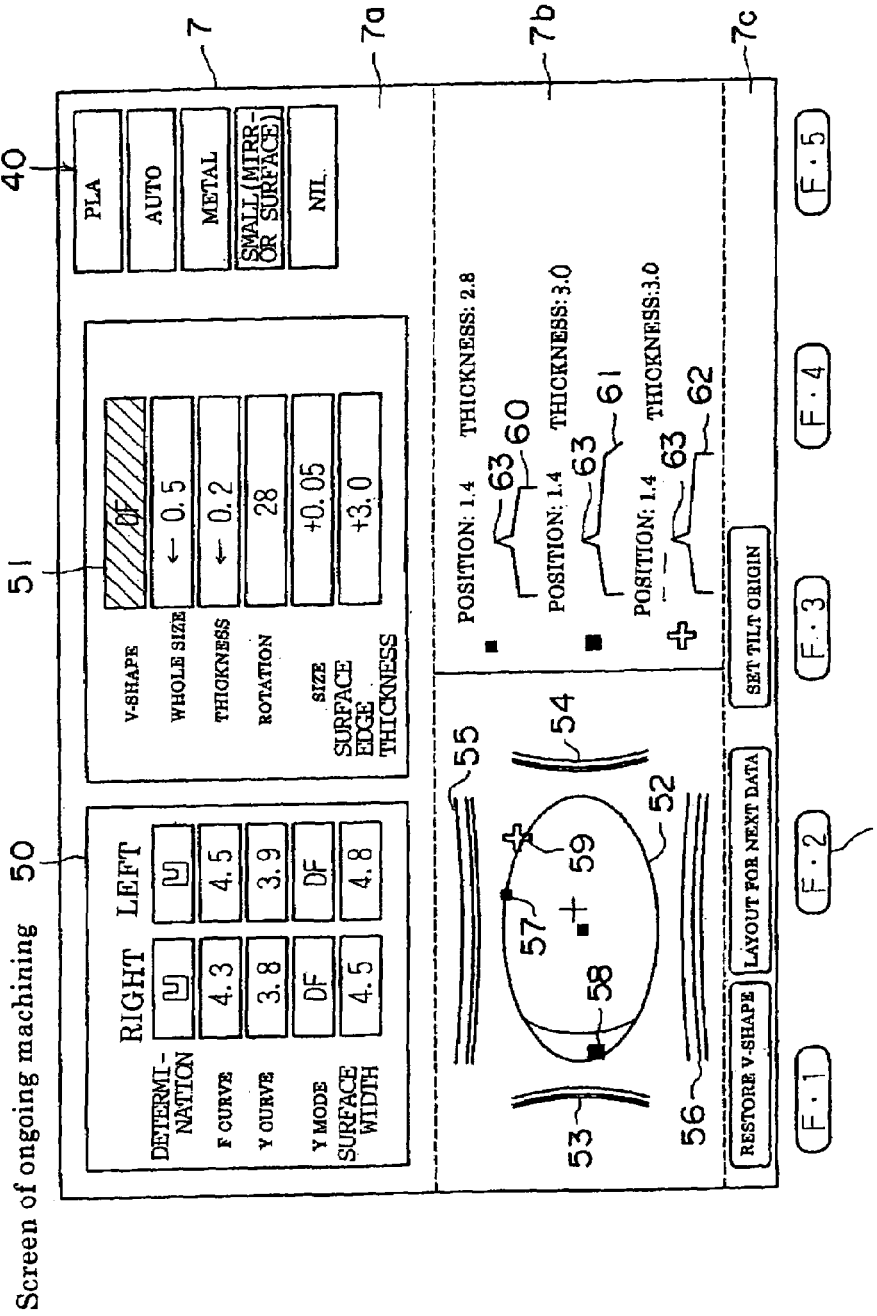
FIG. 8 is a diagram for explaining a screen for the normal ongoing machining operation displayed on the liquid crystal display unit shown in FIG. 1.

In this step, the screen of the ongoing machining operation shown in FIG. 8 is displayed, and the process proceeds to step S15. In this screen of the ongoing machining operation, as shown in FIG. 8, the contents of operation such as RESTORE V-SHAPE, LAYOUT OF NEXT DATA and SET TILT ORIGIN are displayed at positions corresponding to the function keys F1 to F3, respectively. Thus, upon operation of the function key F1 on this screen, the RESTORE V-SHAPE operation can be performed; upon operation of the function key F2, the LAYOUT OF NEXT DATA operation can be performed; and upon operation of the function key F3, the SET TILT ORIGIN operation can be performed.

Step S15

In this step, the data request switch 24 is depressed to determine whether new data is requested or not. In the case where new data is requested, the process returns to step S2. Otherwise, the process proceeds to step S25.

Step S16

In this step, it is determined whether the frame data is stored in the set data memory 33 or not. In the case where the frame data is so set, the process proceeds to step S4. Otherwise, the process proceeds to step S1.

Step S17

In this step, it is determined that the function key F4 is depressed and the operation is performed for displaying the V edge shape. In the case where the operation is performed for V edge shape display, the process proceeds to step S14. Otherwise, the process returns to step S1.

Step S18

After the V edge display screen of the ongoing normal machining process is displayed in step S14 as shown in FIG. 8, steps S14, S15 and S25 are looped in the case where there is no request for new data in step S15 and the layout operation is not performed in step S25.

Figure 9:
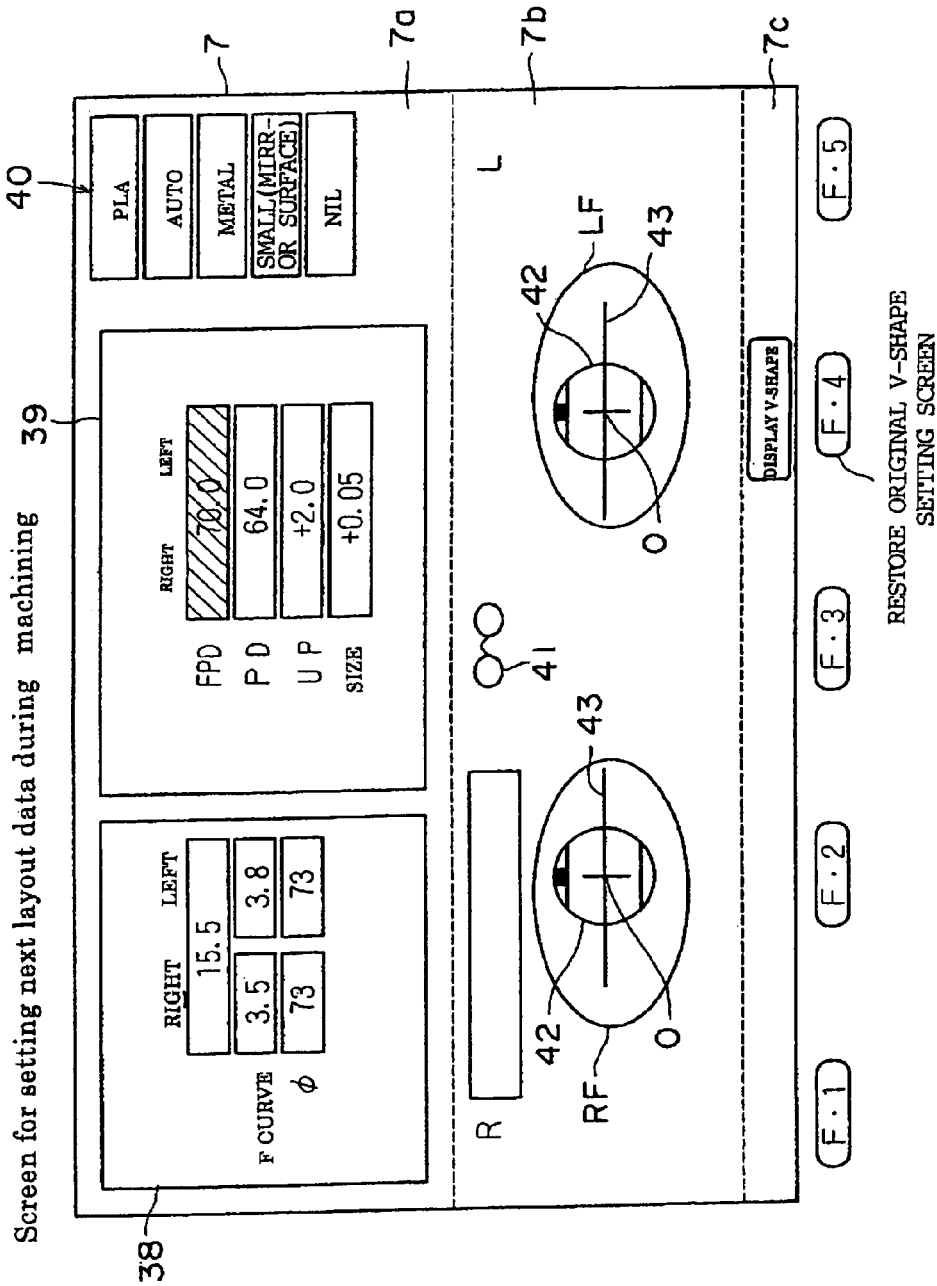
FIG. 9 is a diagram for explaining the layout setting screen for the next data displayed on the liquid crystal display unit shown in FIG. 1.

In the case where the function key F2 corresponding to LAYOUT OF NEXT DATA on the display screen of FIG. 8 is depressed during the looping, the process proceeds from step S25 to step S4, so that the layout screen as shown in FIG. 9 is displayed for layout of the next data. Then, the process proceeds to step S5 for sequential determination of steps S5 and S6 described above.

The operation of the function key F2 during the looping of steps S14, S15 and S25 is the second or subsequent one. In step S6, therefore, it is determined that the layout operation is not the first one but the second or subsequent one, and the process proceeds to step S18. In this step, the set color of the next data layout screen is changed to inform that the layout set operation is not the first one and the process proceeds to step S19.

Step S19

In this step, the function key F5 corresponding to ACCESS MEMORY on the layout screen of FIG. 6 is depressed, and it is determined whether the operation of reading the data for data selection stored in the set data memory 33 has been performed or not.

In the case where the data read operation has been performed, the select screen for the set data stored in the set data memory 33 is displayed as shown in FIG. 7, and the process proceeds to step S20. In the case where the data read operation has not be performed, on the other hand, the process loops.

In the set data selection screen of FIG. 7, the select frames designated by Nos. 1 to 8 are displayed, and whether a plurality of the frame data stored in the set data memory 33 and the data for which the layout is completely set is present or not in the select frames of Nos. 1 to 8 is displayed.

Step S20

In this step, the function key F5 corresponding to SELECT DATA is depressed to select data, and it is determined whether the data read operation is complete or not. Unless the data read operation is complete, the looping occurs. During this looping, one of the select frames Nos. 1 to 8 displayed in the set data selection screen of FIG. 7 is selected thereby to change the display color of the selected display frame. In addition, the very one data of Nos. 1 to 8 with the display frame thereof changed by this operation is read from the set data memory 33 and displayed in the display frames 38, 39 in the upper portion of the liquid crystal display unit 7.

Also, the function key F5 is depressed to perform SELECT DATA, and in the case where the data read operation is complete, the process proceeds to step S21.

Step S21

In this step, it is determined whether the operation of setting the layout is complete or not. In the case where the operation is complete, the process proceeds to step S22. Otherwise, the process loops.

During the looping, the input operation is performed by the switches 17 to 21 on the panel section 6b of another operation panel 6 to carry out the layout for geometric center distance between left and right lens frames (frame FPD), the papillary distance PD and the up shift UP. As a result of this input operation, the lens frames LF and RF displayed on the liquid crystal display unit 7 are shifted in any of four directions as relative to the cross hairs 43 thereby to accomplish the layout.

Step S22

In this step, the layout result is stored in the set data memory 33 and the process proceeds to step S10.

Step S23

In this step, the process corresponding to the function keys F2 to F5 is carried out and the process returns to step S1.

Step S24

In this step, it is determined whether the data request switch 24 is depressed and a new data request is issued or not. In the case where a new data is requested, the process returns to step S2. In the absence of a new data request, the process proceeds to step S12.

Step S25

In this step, it is determined whether the switches 17 to 21 on the section 6b are operated and the layout operation has been performed or not. In the case where such operation has been performed, the process proceeds to step S4. Otherwise, the process proceeds to step S14.

(2) Control Operation by First Arithmetic Control Circuit 32

Figure 5:
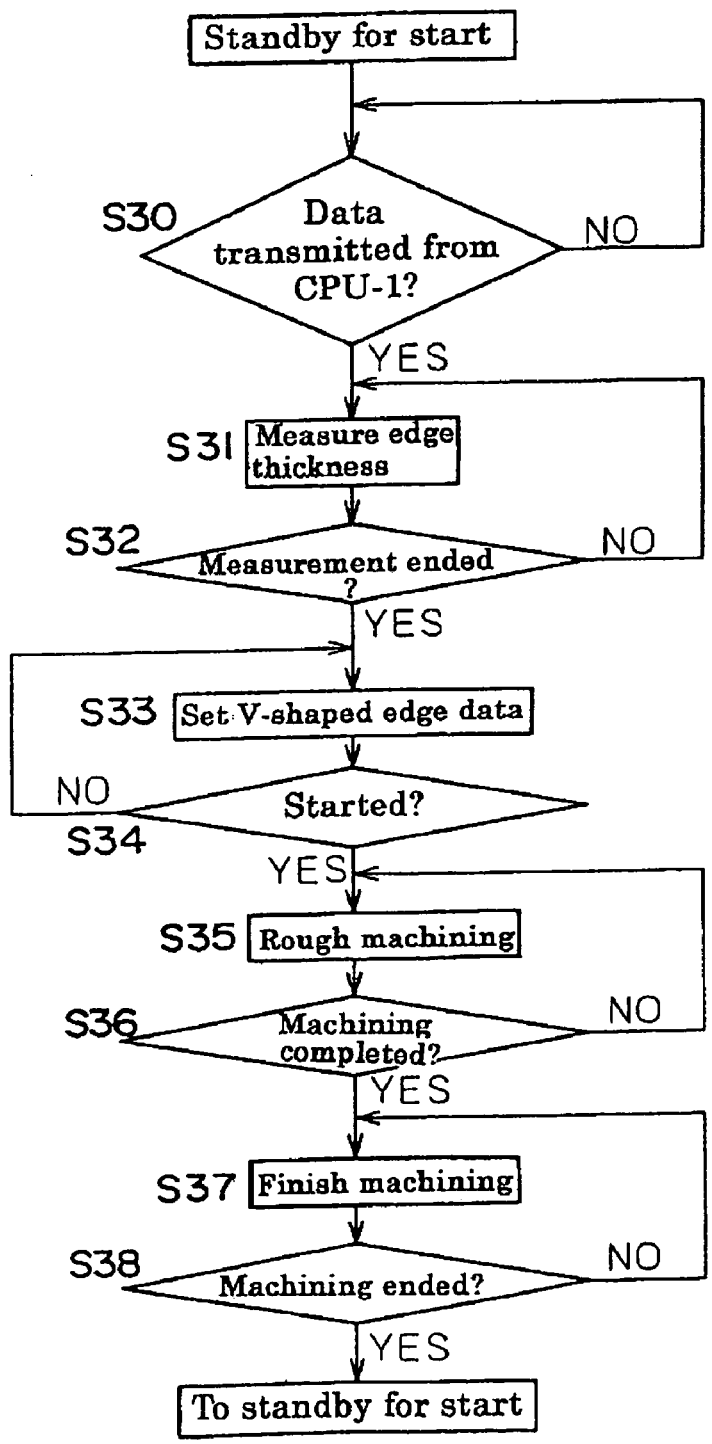
FIG. 5 is a control flowchart for the second arithmetic control circuit shown in FIG. 3.

Once the layout data stored in step S9 or the layout data selected in step S11 is sent from the first arithmetic control circuit 31 to the second arithmetic control circuit 32 in step S13, the normal machining operation of steps S30 to S38 is started by the second arithmetic control circuit 32 shown in FIG. 5.

The machining operation by the arithmetic control circuit 32 and the control operation by the arithmetic control circuit 32 are carried out separately in parallel.

Step S30

In this step, it is determined whether the layout data has been sent from the first arithmetic control circuit 31 or not. In the case where the layout data is so sent, the process proceeds to step S31. Otherwise, the looping occurs.

Step S31

In this step, the measurement of the lens edge thickness of an unprocessed lens (not shown) held between the lens rotation shafts in the machining chamber 4 is started and the process proceeds to step S32. Once this measurement is started, a pair of feelers driven by a drive motor such as a pulse motor advance into the machining chamber 4, and the forward ends of the feelers come into contact with the front and rear refraction surfaces, respectively, of the unprocessed lens. The second arithmetic control circuit 32 controls the rotation of the drive motor for driving the rotation shaft pair for each angle θi based on the lens shape information (θi, ρi) on the one hand and the operation of the drive motor for driving the feelers based on the lens shape information (θi, ρi) on the other hand. Thus, the position at which the feelers are in contact with the unprocessed lens moves to the position associated with the radius vector ρi of the unprocessed lens. In the process, the signal representing the interval between the feelers is detected by the interval measuring means 36 and input to the second arithmetic control circuit 32, so that the lens edge thickness Wi in the lens shape information (θi, ρi) is determined by the second arithmetic control circuit 32 based on the interval signal from the interval measuring means 36. This measurement is carried out over the range of 360° in which the lens rotation shafts make one rotation.

Step S32

In this step, it is determined whether the edge lens thickness Wi has been completely measured for each predetermined angle until the lens rotation shafts make one rotation. In the case where the measurement is so completed, the process proceeds to step S33. Otherwise, the process returns to step S31 to loop.

Step S33

In this step, the screen of the ongoing normal machining operation shown in FIG. 8 is displayed and the operation of setting the V-shaped edge data is started and the process proceeds to step S34. In the screen of the ongoing normal machining operation, the data display frames 50 of the left and right lenses are displayed on the left side of the data display unit 7a, the data display frame 51 for indicating the V shape in the central portion of the data display section 7a, and the select menu 40 on the right side of the data display section 7a. Whether the left and right lenses are concave or convex lenses, the frame curve F CURVE, the V-shaped edge curve Y CURVE, the V-shaped edge mode Y MODE, SURFACE WIDTH, etc. are displayed in the data display frame 50. Such items as the V shape DF, the whole size "*(c)0.5", thickness "*(c)0.2", rotation "28", size "+0.05", surface edge "+3.0", etc. are displayed in the display frame 51. Also, select frames such as PLA for lens material selection, AUTO for machining course selection, METAL for frame material section, SPECIAL (MIRROR SURFACE), NIL, etc. are displayed in the select menu 40.

Further, the lens frame shape 52, the left and right side surface shapes 53, 54 and the upper and lower side surface shapes 55, 56 of the lens frame shape 52 based on the lens shape information (θi, ρi) are displayed on the left side of the image display section 7b. A small black square mark 57, a large black square mark 58 and a white cross hairs cursor 59 are also displayed on the left side of the image display section 7b. On the other hand, V shapes 60, 61, 62 corresponding to the marks 57, 58 and the cursor 59 are displayed on the right side of the image display section 7b.

Further, as shown in FIG. 8, the operation contents such as RESTORE V SHAPE, LAYOUT OF NEXT DATA and SET TILT ORIGIN are displayed in the function key operation contents display section 7c at positions corresponding to the function keys F1 to F3, respectively. When the function key F1 is operated on this screen display, the RESTORE V SHAPE operation can be performed; when the function key F2 is operated, the LAYOUT OF NEXT DATA operation can be performed; and when the function key F3 is operated, the SET TILT ORIGIN operation can be performed.

Step S34

In this step, it is determined whether the left start switch 22 or the right start switch 23 shown in FIG. 2 has been depressed. In the case where either switch is depressed, the process returns to step S35. Otherwise, the process returns to step S33 for looping.

In this way, the V shape is automatically set based on the lens edge thickness Wi measured with the angle θi during the looping or the operation for setting the V shape is performed using the switches 17 to 21 of the panel section 6b based on the lens edge thickness Wi. In this V-shape setting, the ratio between the distance from the front refraction surface (left end) to the top of the V-shaped portion and the distance from the rear refraction surface (right end) to the top of the V-shape portion is set to 1:4, for example, as shown. Thus, the V-shaped portion 63 is set at the position with the edge thickness of 2.8 mm indicated by the mark 57, the position with the edge thickness of 3.0 mm indicated by the mark 58 and the position with the edge thickness of 3.0 mm indicated by the cursor 59.

Step S35

In step S35, the unprocessed lens is roughly machined into a lens shape based on the lens shape information (θi, ρi), after which the V-shaped portion 63 is roughly machined at the edge of the unprocessed lens machined into a lens shape based on the set V shape data and the process proceeds to step S36.

Step S36

In this step, it is determined whether the rough machining operation has been complete or not. In the case where such machining operation is not complete, the looping occurs, while the machining operation is complete, the process proceeds to the next step S37.

Step S37

In this step, the finish machining of the lens edge and the V-shaped portion roughly machined in step S35 are started and process proceeds to step S38.

Step S38

In this step, it is determined whether the finish machining operation is complete or not. Unless it is finished, the looping is started. Otherwise, the standby state is begun for starting the operation before the next layout data arrives.

Second Embodiment of Invention

Figure 10:
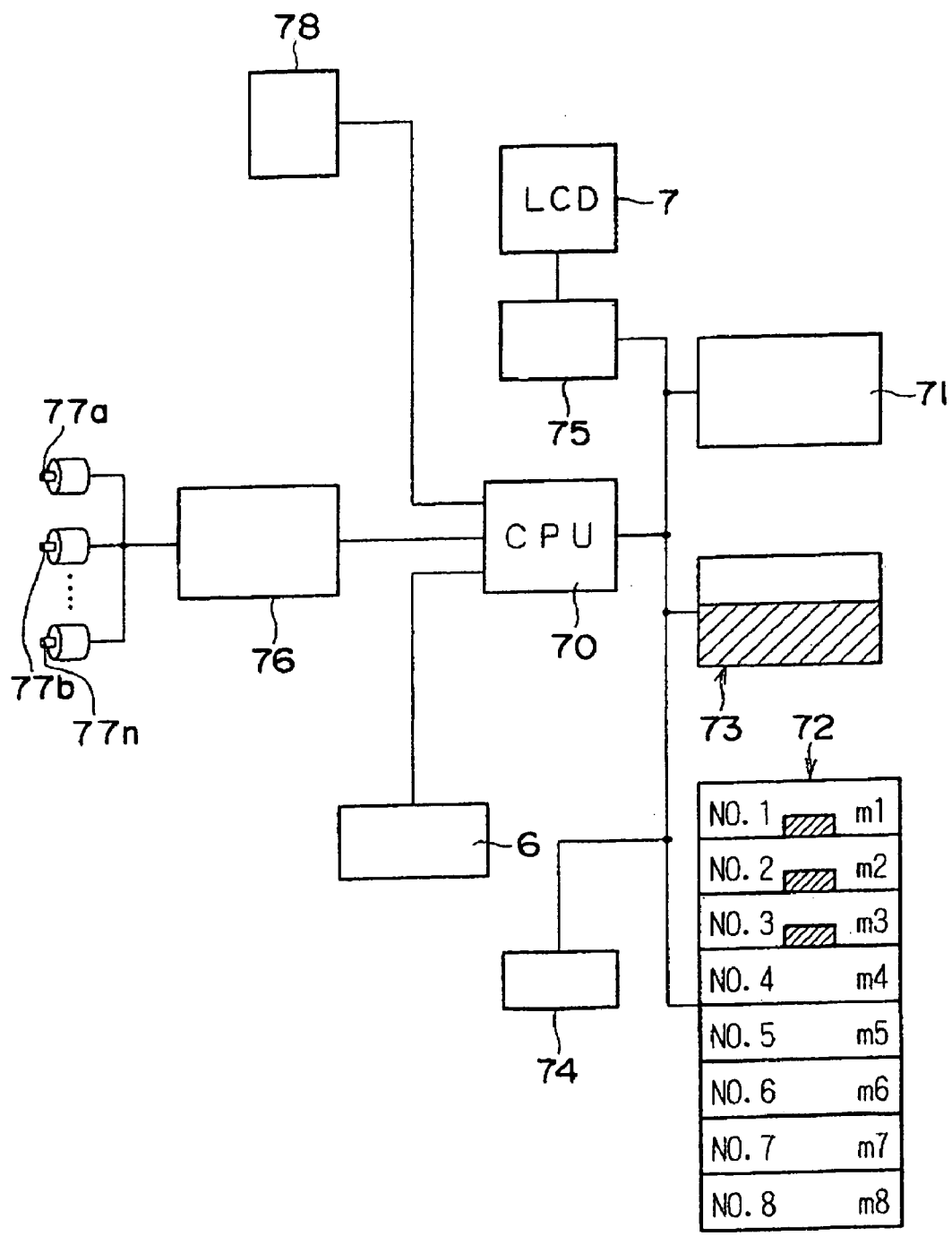
FIG. 10 is a diagram for explaining the control circuit of the lens grinding machine having a lens shape data processing unit according to the second embodiment of the invention.

FIG. 10 shows a control circuit for a lens grinding machine according to the second embodiment of this invention.

An arithmetic control circuit (arithmetic processing means) 70 having a CPU is connected with an operation panel 6, a ROM 71 as storage means, a data memory 72 as storage means and a RAM 73 as storage means on the one hand and a correction value memory 74 on the other hand. Also, the arithmetic control circuit 70 is connected with a liquid crystal-display unit 7 through a display driver 75 and various drive motors (pulse motors) 77a, . . . , 77n for the grinding means through a pulse motor drive 76 on the one hand and a frame reader 2 constituting the frame shape measuring unit of FIG. 1 through a communication port 78 on the other hand.

Figure 11:
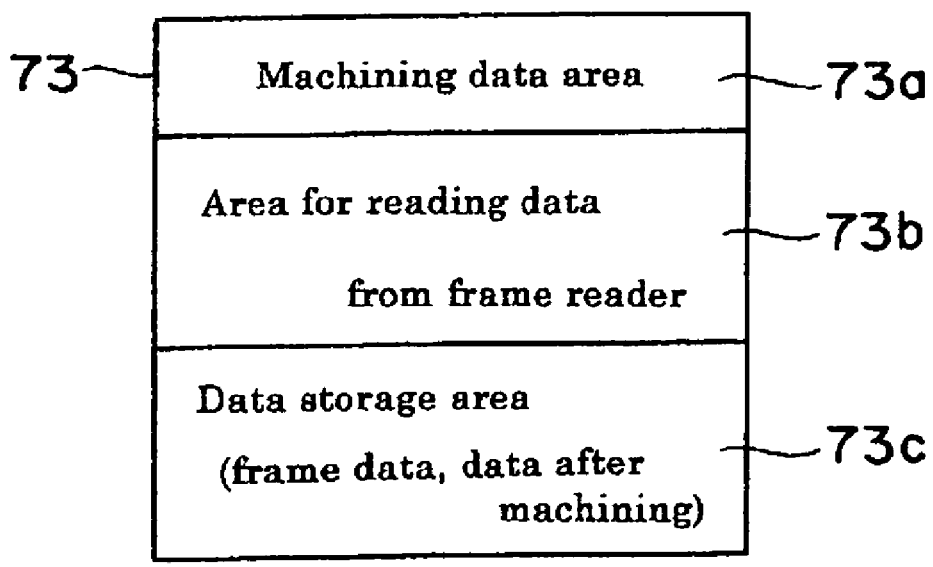
FIG. 11 is a diagram for explaining a RAM of the control circuit shown in FIG. 10.

Various programs for controlling the operation of the lens grinding machine 1 are stored in the ROM 71, and the data memory 72 has a plurality of data storage areas designated by Nos. 1 to 8. Also, the RAM 73, as shown in FIG. 11, includes an ongoing machining data area (machining data storage area) 73a, a new data reading area (new data storage area) 73b and a frame data/machined data storage area 73c. The data memory 72 may also be a read/write FE2 PROM (flush E2 PROM) or a RAM with backup power preventing the erasure of the data even if the main power fails.

Now, an explanation will be given of the operation of the lens grinding machine having a control circuit configured as described above.

Figure 12:
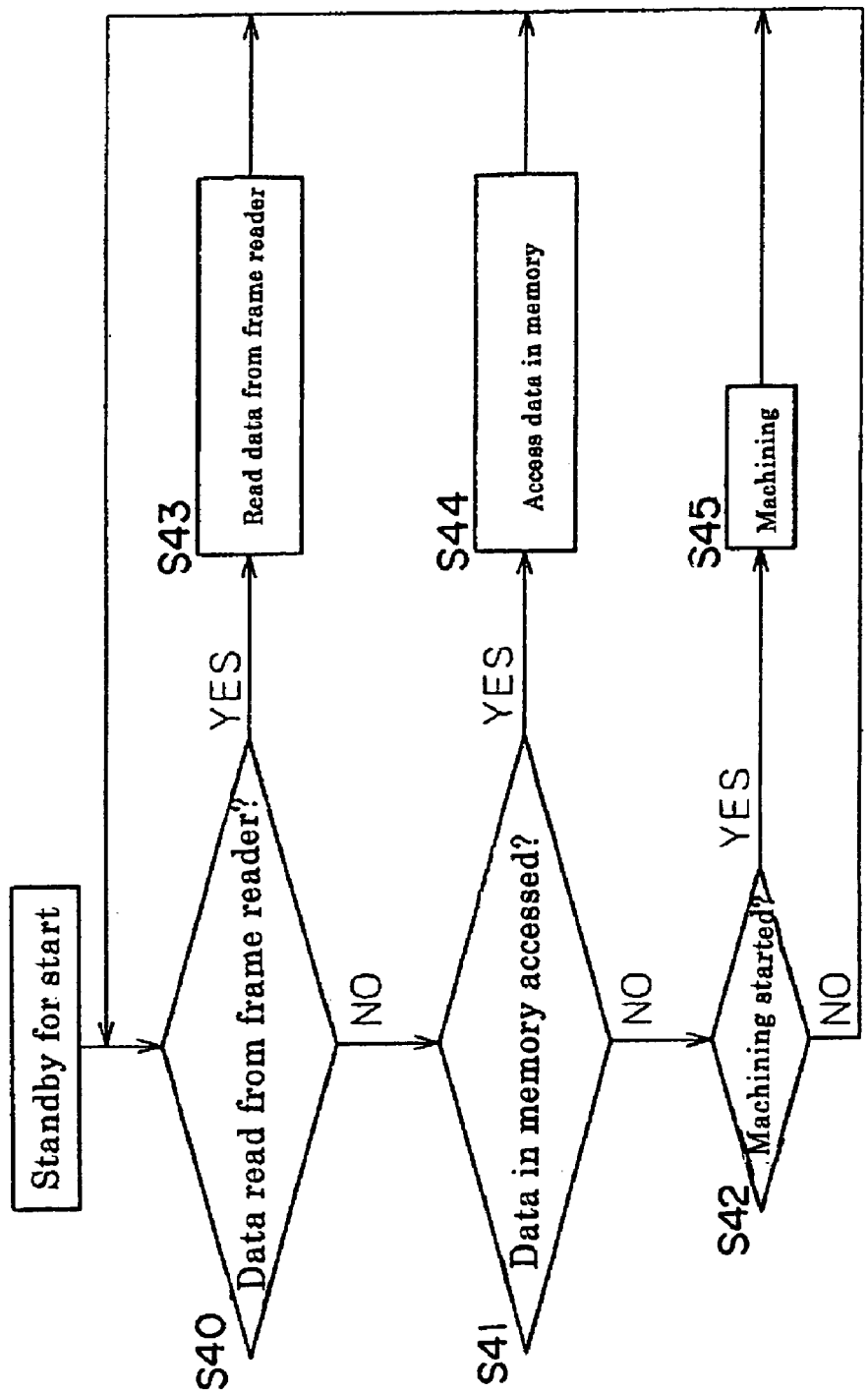
FIG. 12 is a control flowchart for the arithmetic control circuit shown in FIG. 11.

When the main power is switched on in standby state, the arithmetic control circuit 70 determines in step S40 of FIG. 12 whether the data is read from the frame reader 2. Specifically, the arithmetic control circuit 70 determines whether the data request switch 24 on the operation panel 6 of FIG. 2 has been depressed or not. In the case where the switch 24 has been depressed and a data request is issued, the process proceeds to step S43 where the data of the lens shape information (θi, ρi) is read into the data read area 73b of the RAM 73 from the frame reader 2, after which the process returns to step S40 for looping. The data thus read is stored in any one of the storage area m1 (data storage area corresponding to the select frame No. 1 in FIG. 7) to the storage area m8 (data storage area corresponding to the select frame No. 8 in FIG. 7) of the data memory 72, and the layout screen shown in FIG. 6 is displayed on the liquid crystal display unit 7.

In the absence of a data request with the switch 24 not depressed, on the other hand, the layout screen shown in FIG. 6 is displayed on the liquid crystal display unit 7, and the process proceeds to step S41. In step S41, it is determined whether the function key F5 of FIG. 6 is depressed and the access to the data stored in the data memory 72 is requested or not. In the case where the data access is requested, the data selection screen shown in FIG. 7 is displayed on the liquid crystal display unit 7, and the process proceeds to step S44.

In the absence of a data access request, on the other than, the screen of ongoing normal machining operation (V-shaped portion setting screen) of FIG. 8 is displayed on the liquid crystal display unit 7 and the process proceeds to step S42.

In step S44, one of the select frames Nos. 1 to 8 displayed on the set data selection screen of FIG. 7 is selected using the switches 19, 20 on the operation panel 6 of FIG. 2, so that the display color of the selected display frame is changed. In addition, one of the data Nos. 1 to 8 of the data memory 72 with the display frame thereof changed by this operation is read out and stored in the data storage area 73c of the RAM 73, while at the same time being displayed in the display frames 38, 39 in the upper portion of the liquid crystal display unit 7. Then, the function key F5 is depressed to perform the SELECT DATA operation, and upon complete data read operation, the process returns to step S40 for looping.

In step S42, it is determined whether the left start switch 22 or the right start switch 23 is depressed to issue a machining start instruction or not. In the case where it is determined that a machining start instruction has been issued, the process proceeds to step S45, in which the operation of the drive motors 77a to 77n is controlled through the pulse motor driver 76 to conduct the machining operation, after which the process returns to step S40 for looping.

During the looping, the arithmetic control circuit 70 performs the edge thickness measurement, the V-shaped portion setting, the rough machining (including the machining of the V-shaped portion) and the finish machining as in the first embodiment described above.

Figure 13:
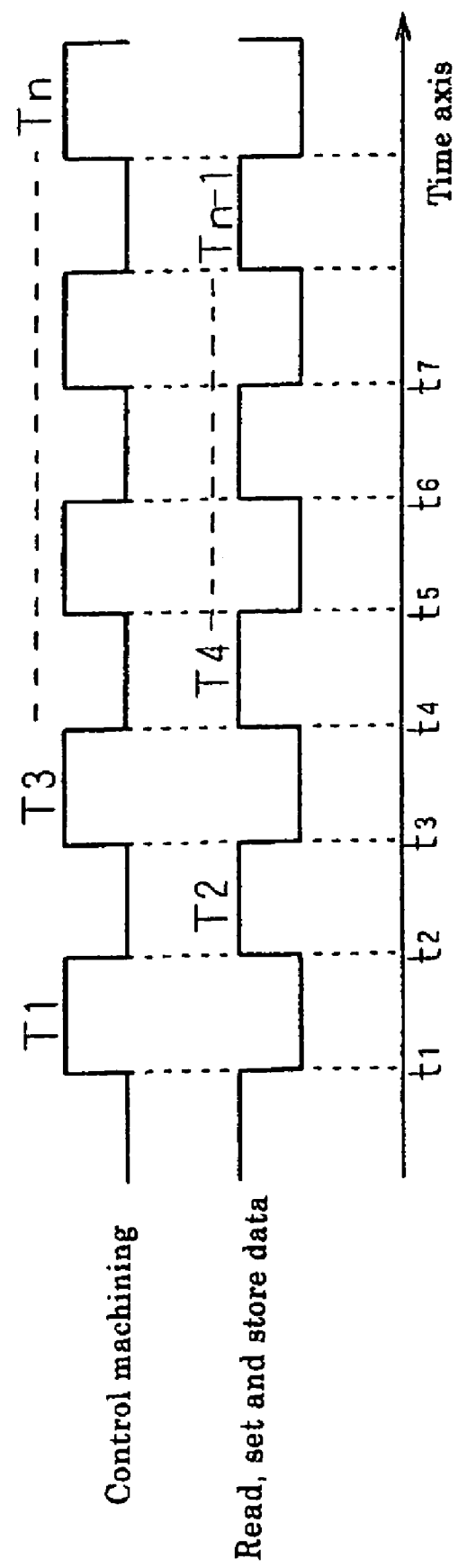
FIG. 13 is a time chart for explaining the control operation of the arithmetic control circuit shown in FIG. 11.

In the case where the data is read from the frame reader 2 of step S43 or the data is read from the storage areas m1 to m8 of the data memory 72 of step S44 after starting the machining control operation in step S45, the arithmetic control circuit 70 controls the layout setting, the data read operation and the machining control operation by time division as shown in FIG. 13. Specifically, assume that the period between time points t1 and t2 is T1, the period between time points t2 and t3 is T2, the period between time points t3 and t4 is T3, . . . and the period between time points tn-1 and tn is Tn-1. Then, the machining control operation is performed during the periods T1, T3, . . . , Tn (n: odd number), while the data is read and the layout setting is controlled during the periods T2, T4, . . . , Tn-1. Thus, during the grinding process for the unprocessed lens, a plurality of the next lens shape data can be read and stored or the layout setting (adjustment) can be carried out, thereby remarkably improving the working efficiency of the data processing.

As described above, the lens shape data processing apparatus for the spectacle frame according to the present invention can store a plurality of the lens shape data in the data processing unit and therefore the data processing efficiency is greatly improved.

Also, the apparatus has the arithmetic processing means for reading a plurality of lens shape data stored in the storage means and adjusting the lens shape data, so that a plurality of lens shape data can be read out for adjustment of the lens shape data.

Further, a lens shape data processing apparatus for the spectacle frame according to the invention comprises display means including an image display section for displaying a plurality of lens shape information for the spectacle frame and an operation contents display section for displaying items for switching a plurality of screens, a plurality of keys arranged at positions corresponding to the items of the operation contents display unit, and arithmetic control means for setting the data for grinding an unprocessed lens into a lens frame shape based on the frame shape information, wherein the keys include a function key for switching the screen to select and access one of a plurality of the lens shape information and a function key for accessing the preceding lens shape information and the next lens shape information or new lens shape information. Therefore, the data for grinding the spectacle lens can be accessed quickly and the efficiency of the data processing work for layout setting can be improved.

A lens grinding machine having a lens shape data processing apparatus for the spectacle frame according to the invention comprises arithmetic processing means for selecting one of a plurality of lens shape data and setting and adjusting the machining conditions for an unprocessed spectacle lens based on the same data during the operation of the lens edge shape measuring means or the machining means. Thus, a plurality of lens shape data can be stored in the body of the lens grinding machine for a greatly improved data processing efficiency. Also, the apparatus comprises storage means for storing the machining conditions for an unprocessed spectacle lens based on the lens shape data selected during the operation of the lens edge shape measuring means or the machining means or the machining conditions for an unprocessed spectacle lens based on the next lens shape data set and adjusted. Therefore, during the lens edge measurement or the grinding process, the data for another process such as the reading of the lens shape data for the spectacle frame or the layout setting process, etc. can be carried out in parallel. Thus, the working efficiency is improved and the number of spectacle lenses that can be ground per day can be remarkably increased.

Further, a lens grinding machine having a lens shape data processing apparatus for the spectacle frame according to the invention comprises display means including an image display section for displaying a plurality of lens shape information for the spectacle frame and an operation contents display section for displaying items for switching a plurality of screens, a plurality of keys arranged at positions corresponding to the items of the operation contents display unit, and arithmetic control means for setting the data for grinding an unprocessed lens into a lens frame shape based on the frame shape information, wherein the keys include a function key for switching the screen for selecting and accessing one of a plurality of the lens shape information and a function key for accessing the preceding lens shape information and the next lens shape information or new lens shape information. Therefore, the data for grinding the spectacle lens can be accessed quickly and the efficiency of the data processing work for layout setting can be improved.

What is claimed is:

1. A lens grinding machine comprising:
   an input device configured to input lens shape data of a spectacle frame;
   a lens edge surface shape measuring unit configured to measure a lens edge surface shape of an unprocessed spectacle lens based on the lens shape data;
   a machining unit configured to grind a lens edge surface of the unprocessed spectacle lens based on the lens shape data according to a result of measurement by the lens edge surface shape measuring unit; and
   a memory configured to store a plurality of the lens shape data inputted from the input device.

2. The lens grinding machine as set forth in claim 1, further comprising an arithmetic processing unit configured to read the plurality of the lens shape data stored in the memory and to adjust the lens shape data.

3. The lens grinding machine as set forth in claim 1, wherein the memory is configured to store the plurality of the lens shape data inputted from the input device during at least one of an operation of the lens edge surface shape measuring unit and an operation of the machining unit.

4. The lens grinding machine as set forth in claim 3, further comprising an arithmetic processing unit configured to read the plurality of the lens shape data stored in the memory and to adjust the lens shape data.

5. A lens grinding machine comprising:
   input means for inputting lens shape data of a spectacle frame;
   lens edge surface shape measuring means for measuring a lens edge surface shape of an unprocessed spectacle lens based on the lens shape data;
   machining means for grinding a lens edge surface of the unprocessed spectacle lens based on the lens shape data according to a result of measurement by the lens edge surface shape measuring means; and
   storage means for storing a plurality of the lens shape data inputted from the input means.

6. The lens shape grinding machine as set forth in claim 5, further comprising arithmetic processing means for reading the plurality of the lens shape data stored in the storage means and for adjusting the lens shape data.

7. The lens grinding machine as set forth in claim 5, wherein the storage means stores the plurality of the lens shape data inputted from the input means during at least one of an operation of the lens edge surface shape measuring means and an operation of the machining means.

8. The lens grinding machine as set forth in claim 7, further comprising arithmetic processing means for reading the plurality of the lens shape data stored in the storage means and for adjusting the lens shape data.

9. A lens shape data processing apparatus comprising:
   a display including an image display unit configured to display a plurality of lens shape information for spectacle frames and an operation contents display unit configured to display items for switching a plurality of screens;
   a plurality of keys corresponding to said items of said operation contents display unit; and
   an arithmetic control unit configured to set data and to grind an unprocessed lens into a lens shape based on said lens shape information,
   wherein said plurality of keys includes a first function key configured to switch at least one of said plurality of screens to select and access one of said plurality of lens shape information and a second function key configured to access a preceding lens shape information and at least one of a next lens shape information and new lens shape information.

10. The lens shape data processing apparatus as set forth in claim 9, further comprising a memory configured to store said plurality of the lens shape information for the spectacle frames.

11. A lens shape data processing apparatus comprising:
display means for displaying, said display means including image display means for displaying a plurality of lens shape information for spectacle frames and operation contents display means for displaying items for switching a plurality of screens;
a plurality of keys corresponding to said items of said operation contents display means; and
arithmetic control means for setting data for grinding an unprocessed lens into a lens shape based on said lens shape information,
wherein said plurality of keys includes a first function key for switching at least one of said plurality of screens to select and access one of said plurality of lens shape information and a second function key for accessing a preceding lens shape information and at least one of a next lens shape information and new lens shape information.

12. The lens shape data processing apparatus as set forth in claim 11, further comprising memory means for storing said plurality of the lens shape information for the spectacle frames.

13. A lens grinding machine comprising:
an input device configured to input lens shape data of a spectacle frame;
a memory configured to store a plurality of the lens shape data inputted from the input device;
a lens edge surface shape measuring unit configured to measure a lens edge surface shape of an unprocessed spectacle lens based on the lens shape data;
a machining unit configured to grind a lens edge surface of said unprocessed spectacle lens based on the lens shape data according to a result of measurement by the lens edge surface shape measuring unit; and
an arithmetic processing unit configured to select one of said plurality of the lens shape data stored in the memory and to set and adjust machining conditions for the unprocessed spectacle lens based on said selected lens shape data during at least one of an operation of said lens edge surface shape measuring unit and an operation of said machining unit.

14. A lens grinding machine as set forth in claim 13, wherein the memory stores the machining conditions of the unprocessed spectacle lens based on the lens shape data selected during at least one of the operation of the lens edge surface shape measuring unit and the operation of the machining unit, or stores machining conditions of the unprocessed spectacle lens based on lens shape data subsequent to the lens shape data set and adjusted during at least one of the operation of said lens edge surface shape measuring unit and during the operation of said machining unit.

15. A lens grinding machine comprising:
input means for inputting lens shape data of a spectacle frame;
storage means for storing a plurality of the lens shape data inputted from the input means;
lens edge surface shape measuring means for measuring a lens edge surface shape of an unprocessed spectacle lens based on the lens shape data;
machining means for grinding a lens edge surface of said unprocessed spectacle lens based on the lens shape data according to a result of measurement by the lens edge surface shape measuring means; and
arithmetic processing means for selecting one of said plurality of the lens shape data stored in the storage means and for setting and adjusting machining conditions for the unprocessed spectacle lens based on said selected lens shape data during at least one of an operation of said lens edge surface shape measuring means and an operation of said machining means.

16. A lens grinding machine as set forth in claim 15, wherein the storage means stores the machining conditions of the unprocessed spectacle lens based on the lens shape data selected during at least one of the operation of the lens edge surface shape measuring means and during the operation of the machining means, or stores machining conditions of the unprocessed spectacle lens based on lens shape data subsequent to the lens shape data set and adjusted during at least one of the operation of said lens edge surface shape measuring means and the operation of said machining means.

17. A lens grinding machine comprising:
an input device configured to input lens shape data of a spectacle frame;
a memory configured to store a plurality of the lens shape data inputted from the input device;
a lens edge surface shape measuring unit configured to measure a lens edge surface shape of an unprocessed spectacle lens based on the lens shape data;
a machining unit configured to grind a lens edge surface of said unprocessed spectacle lens based on the lens shape data according to a result of measurement by the lens edge surface shape measuring unit; and
an arithmetic processing unit configured to set and adjust machining conditions of the unprocessed spectacle lens based on lens shape data subsequent to the lens shape data used for the ongoing operation within the plurality of the lens shape data stored in the memory during at least one of an operation of said lens edge surface shape measuring unit and an operation of said machining unit.

18. A lens grinding machine as set forth in claim 17, wherein the memory stores machining conditions of the unprocessed spectacle lens based on the lens shape data selected during at least one of the operation of the lens edge surface shape measuring unit and the operation of the machining unit, or stores the machining conditions of the unprocessed spectacle lens based on the lens shape data subsequent to the lens shape data set and adjusted during at least one of the operation of said lens edge surface shape measuring unit and the operation of said machining unit.

19. A lens grinding machine comprising:
input means for inputting lens shape data of a spectacle frame;
storage means for storing a plurality of the lens shape data inputted from the input means;
lens edge surface shape measuring means for measuring a lens edge surface shape of an unprocessed spectacle lens based on the lens shape data;
machining means for grinding a lens edge surface of said unprocessed spectacle lens based on the lens shape data according to a result of measurement by the lens edge surface shape measuring means; and
arithmetic processing means for setting and adjusting machining conditions of the unprocessed spectacle lens based on lens shape data subsequent to the lens shape data used for the ongoing operation within the plurality of the lens shape data stored in the storage means during at least one of an operation of said lens edge surface shape measuring means and an operation of said machining means.

20. A lens grinding machine as set forth in claim 19, wherein the storage means stores machining conditions of the unprocessed spectacle lens based on the lens shape data selected during at least one of the operation of the lens edge surface shape measuring means and during the operation of the machining means, or stores the machining conditions of the unprocessed spectacle lens based on the lens shape data subsequent to the lens shape data set and adjusted during at least one of the operation of said lens edge surface shape measuring means and during the operation of said machining means.

21. A lens grinding machine comprising:

a display including an image display unit configured to display a plurality of lens shape information for spectacle frames and an operation contents display unit configured to display items for switching a plurality of screens;

a plurality of keys corresponding to said items of said operation contents display unit; and an arithmetic control unit configured to set data and to grind an unprocessed lens into a lens shape based on said lens shape information, wherein said plurality of keys includes a first function key configured to switch at least one of said plurality of screens to select and access one of said plurality of lens shape information and a second function key configured to access a preceding lens shape information and at least one of a next lens shape information and a new lens shape information.

22. A lens grinding machine comprising:

display means for displaying, said display means including an image display means for displaying a plurality of lens shape information for spectacle frames and an operation contents display means for displaying items for switching a plurality of screens;

a plurality of keys corresponding to said items of said operation contents display means; and arithmetic control means for setting data for grinding an unprocessed lens into a lens shape based on said lens shape information, wherein said plurality of keys includes a first function key for switching at least one of said plurality of screens to select and access one of said plurality of lens shape information and a second function key for accessing a preceding lens shape information and at least one of a next lens shape information and a new lens shape information.

23. A lens grinding machine comprising:

a display including an image display unit configured to display a plurality of lens shape information for spectacle frames and an operation contents display unit configured to display items for switching a plurality of screens;

a plurality of keys corresponding to said items of said operation contents display unit;

a memory configured to store said plurality of the lens shape information for the spectacle frames; and an arithmetic control unit configured to set data to grind means for setting data for grinding an unprocessed lens into a lens shape based on said lens shape information, wherein said plurality of keys includes a first function key configured to switch at least one of said plurality of screens to select and access one of said plurality of lens shape information and a second function key configured to access a preceding lens shape information and at least one of a next lens shape information and a new lens shape information.

24. A lens grinding machine comprising:

display means for displaying, said display means including an image display unit for displaying a plurality of lens shape information for spectacle frames and an operation contents display unit for displaying items for switching a plurality of screens;

a plurality of keys corresponding to said items of said operation contents display unit;

memory means for storing said plurality of the lens shape information for the spectacle frames; and arithmetic control means for setting data for grinding an unprocessed lens into a lens shape based on said lens shape information, wherein said plurality of keys includes a first function key for switching at least one of said plurality of screens to select and access one of said plurality of lens shape information and a second function key for accessing a preceding lens shape information and at least one of a next lens shape information and a new lens shape information.

* * * * *

UNITED STATES PATENT AND TRADEMARK OFFICE
CERTIFICATE OF CORRECTION

PATENT NO.   : 6,945,848 B1
DATED        : September 20, 2005
INVENTOR(S)  : Watanabe et al.

It is certified that error appears in the above-identified patent and that said Letters Patent is hereby corrected as shown below:

<u>Title page,</u>
Items [45] and [*] Notice, should read as follows:
-- [45] **Date of Patent:  *Sep. 20, 2005** --.

-- [*] Notice:   Subject to any disclaimer, the term of this patent is extended or adjusted under 35 U.S.C. 154(b) by 108 days.

This Patent is subject to a terminal disclaimer. --.

Signed and Sealed this

Fifteenth Day of November, 2005

JON W. DUDAS
*Director of the United States Patent and Trademark Office*